Oct. 6, 1959   J. LAUTENBACHER   2,907,248
PHOTOGRAPHIC OBJECTIVES
Filed July 10, 1956
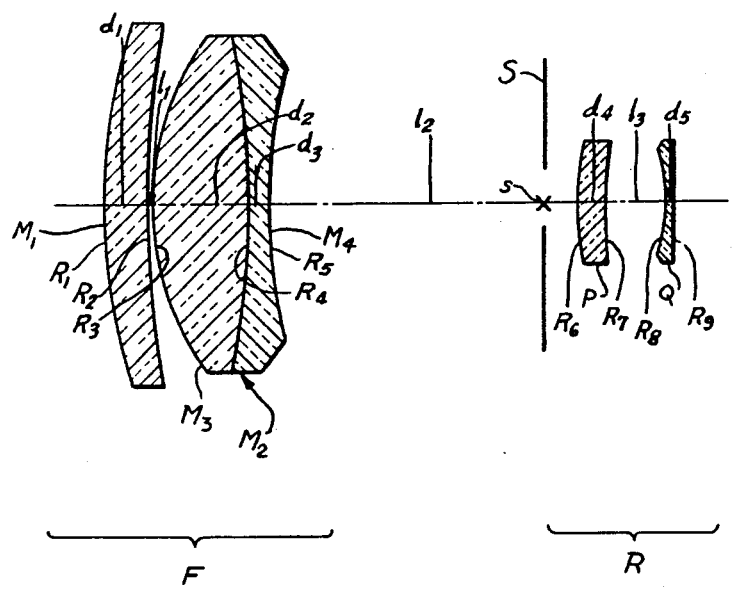

United States Patent Office

2,907,248
Patented Oct. 6, 1959

2,907,248

PHOTOGRAPHIC OBJECTIVES

Johann Lautenbacher, Munich, Germany, assignor to Enna-Werk Optische Anstalt Dr. Appelt K.G., Munich, Germany, a corporation Application July 10, 1956, Serial No. 596,936

Claims priority, application Germany July 19, 1955

3 Claims. (Cl. 88—57)

The present invention relates to photographic objectives, and more particularly to a telephoto objective.

It is an object of the present invention to provide a telephoto objective having a focal length being at least 2.5 times the diameter of the film size used with the telephoto objective.

It is another object of the present invention to provide a telephoto objective suitable for use in connection with cameras having only a relatively small hole in the front plates thereof as it is the case with cameras equipped with normal shutters mounted on said front plate.

It is a further object of the present invention to reduce considerably vignetting which constitutes a disadvantage of known telephoto objectives when used in such cameras unless the front group of lenses has considerably more or larger lens elements than the telephoto objective according to the present invention.

A telephoto objective according to the present invention comprises a collective part arranged in front of the rear part, said rear part being divergent and separated from the collective front part by a relatively large air space.

The front group comprises preferably two meniscus-shaped positive members turning their convex surfaces toward the incident light, at least one of the positive members being formed as a cemented member, whereas the rear part of the telephoto objective according to the present invention comprises single positive and negative elements, the negative element turning the less curved surface thereof toward the image plane and representing the rear member of the total objective.

Preferably a telephoto objective according to the present invention has a minimum aperture of 1:4.0 and a back focal length ranging between 0.25 and 0.35 of the effective focal length of the total system.

The present invention allows one to attain an excellent correction of all optical defects including the rather critical distortion of telephoto objectives having a relatively short back focal length.

According to the present invention the single convergent element of the rear group is a positive meniscus lens and turns the convex surface thereof toward the front group of the system and thus towards the front of the objective, and the axial overall length of the front group amounts to between 0.33 and 1.0 times the length of the axial air space separating the front group from the rear group of the telephoto objective.

In the figure of the drawing forming part of this specification a preferred embodiment of a telephoto objective according to the invention is shown.

The only figure of the drawing shows a sectional elevation of a telephoto objective according to the present invention.

Referring now to the drawing, a telephoto objective is shown for an effective focal length $f=135$ millimeters. The front group F includes a first meniscus-shaped front member $M_1$ having an axial thickness $d_1$ and front and rear surfaces having, respectively, the radii $R_1$ and $R_2$ separated by an air gap having the axial length $l_1$ from a combined meniscus-shaped front member generally indicated at $M_2$ cemented along a surface having the radius $R_4$ and including a second double convex shaped front member $M_3$ having an axial thickness $d_2$ and a front surface having a radius $R_3$, and a third double concave shaped front member $M_4$ having the axial thickness $d_3$ and a rear surface having a radius $R_5$. The front group F is separated from the rear group R by an air space having a relatively long length $l_2$ in which a light stop S having an aperture $s$ of variable radius is arranged near to the convergent element P of the rear group R presently to be described more in detail.

The rear group R includes a first or positive meniscus-shaped rear element P having an axial thickness $d_4$ and being limited by front and rear surfaces having, respectively, the radii $R_6$ and $R_7$. The first or positive meniscus-shaped rear element P is separated from the second negative concave plano shaped element Q having an axial thickness $d_5$ and front and rear surfaces having, respectively, radii $R_8$ and $R_9$ by an air space having a length $l_3$, expressed in terms of the focal length $f$ of the total system; where $f=1.0$, the radius $R_1=+0.5450$, $d_1=0.046$, and $l_2=0.304$.

The lens systems have the following characteristics, expressed in terms of the focal length $f$ of the system:

$$0.400 \; f < R_1 < 0.90 \; f$$
$$0.700 \; f < R_2 < 2.50 \; f$$
$$0.150 \; f < R_3 < 0.50 \; f$$
$$0.800 \; f < R_4 < 3.00 \; f$$
$$0.400 \; f < R_5 < 2.00 \; f$$
$$0.200 \; f < R_6 < 0.80 \; f$$
$$0.800 \; f < R_7 < 8.00 \; f$$
$$0.120 \; f < R_8 < 0.35 \; f$$
$$-1.000 \; f < R_9 < +1.00 \; f$$
$$0.020 \; f < d_1 < 0.15 \; f$$
$$0.040 \; f < d_2 < 0.25 \; f$$
$$0.010 \; f < d_3 < 0.15 \; f$$
$$0.005 \; f < d_4 < 0.20 \; f$$
$$0.001 \; f < d_5 < 0.10 \; f$$
$$0.000 \; f < l_1 < 0.15 \; f$$
$$0.200 \; f < l_2 < 0.50 \; f$$
$$0.020 \; f < l_3 < 0.15 \; f$$

The following table refers to an embodiment of the present invention having an effective focal length $f=1.0$ while the back focal length amounts to $s'=0.29010f$, or $s'=0.29010$. The refractive indices are denoted, respectively, by $n_1$ to $n_5$, whereas the Abbe numbers are denoted, respectively, by $v_1$ to $v_5$. The aperture amounts to 1:3.5 and the field angle to 18°.

| | Radii | Thicknesses and Separations | Index of Refraction | Abbe Number "$v$" or Dispersion Ratio |
|---|---|---|---|---|
| Lens $M_1$ | $R_1=+0.5450f$ | $d_1=0.046f$ | $n_1=1.51112$ | $v_1=60.6$ |
| | $R_2=+1.0900f$ | $l_1=0.002f$ | | |
| Lens System $M_3$-$M_4$ | $R_3=+0.2725f$ | $d_2=9.090f$ | $n_2=1.51895$ | $v_2=57.3$ |
| | $R_4=-1.1500f$ | | | |
| | $R_5=+0.5800f$ | $d_3=0.022f$ | $n_3=1.69895$ | $v_3=30.1$ |
| | | $l_2=0.304f$ | | |
| Lens P | $R_6=+0.3750f$ | $d_4=0.025f$ | $n_4=1.63980$ | $v_4=34.6$ |
| | $R_7=+1.6900f$ | $l_3=0.059f$ | | |
| Lens Q | $R_8=-0.1990f$ | $d_5=0.004f$ | $n_5=1.55232$ | $v_5=63.5$ |
| | $R_9=\infty$ | | | |

A further improvement of correction may be attained by attributing to the radius $R_4$ values amounting to 0.8 to 3.0 times the focal length of the total system. In order to improve effectively the chromatic correction of the telephoto objective according to the present invention, preferably the divergent simple rear element Q consists of a glass having $v$-values between 55 and 75.

The present invention is in no way limited to the embodiment of a telephoto objective described hereinabove and shown in the drawings. It may also be adapted to modified and more complicated embodiments thereof.

I wish it to be understood that I do not desire to be limited to the exact details of construction shown and described, for obvious modifications will occur to a person skilled in the art.

It is accordingly desired that in construing the breadth of the appended claims they shall not be limited to the specific exemplifications of the invention described herein.

I claim:

1. A telephoto objective having a focal length $f$ of the total system and comprising, in combination, a rear group of optical elements and a front group of optical elements, said rear group including a positive meniscus lens element turning its convex face towards said front group and thereby towards the front of the objective, the axial overall length of said front group amounting to between 0.33 and 1.0 times the length of the axial air space included by said rear and front groups of optical elements, said front group including at least two convergent members, the second of which having a cemented face of a radius $R_4$ of curvature, the radii $R$ and thicknesses $d$ and air spaces $l$ being as set forth below in terms of said focal length $f$, and being numbered by subscripts in order from front to rear, and the plus and minus signs designating surfaces respectively convex and concave to the front:

$$0.400\ f < R_1 < 0.90\ f$$
$$0.700\ f < R_2 < 2.50\ f$$
$$0.150\ f < R_3 < 0.50\ f$$
$$0.800\ f < R_4 < 3.00\ f$$
$$0.400\ f < R_5 < 2.00\ f$$
$$0.200\ f < R_6 < 0.80\ f$$
$$0.800\ f < R_7 < 8.00\ f$$
$$0.120\ f < R_8 < 0.35\ f$$
$$-1.000\ f < R_9 < +1.00\ f$$
$$0.020\ f < d_1 < 0.15\ f$$
$$0.040\ f < d_2 < 0.25\ f$$
$$0.010\ f < d_3 < 0.15\ f$$
$$0.005\ f < d_4 < 0.20\ f$$
$$0.001\ f < d_5 < 0.10\ f$$
$$0.000\ f < l_1 < 0.15\ f$$
$$0.200\ f < l_2 < 0.50\ f$$
$$0.020\ f < l_3 < 0.15\ f$$

2. In a telephoto objective, as claimed in claim 1, said focal length equalling 1.00, and said radius $R_4$ amounting to from 0.8 to 1.0 times the said focal length $f$.

3. A telephoto objective having the following data:

[Focal length: 1.0; back focal length: 0.29010; aperture: 1.35; field: 18°]

| Radii | Thickness and Separations | Index of Refraction | Abbe Number "$v$" or Dispersion Ratio |
|---|---|---|---|
| $R_1 = -0.5450$ | $d_1 = 0.046$ | $n_1 = 1.51112$ | $v_1 = 60.6$ |
| $R_2 = +1.0900$ | $l_1 = 0.002$ | | |
| $R_3 = +0.2725$ | $d_2 = 0.090$ | $n_2 = 1.51895$ | $v_2 = 57.3$ |
| $R_4 = -1.1500$ | $d_3 = 0.022$ | $n_3 = 1.69895$ | $v_3 = 30.1$ |
| $R_5 = +0.5800$ | $l_2 = 0.304$ | | |
| $R_6 = +0.3750$ | $d_4 = 0.025$ | $n_4 = 1.63980$ | $v_4 = 34.6$ |
| $R_7 = +1.6900$ | $l_3 = 0.059$ | | |
| $R_8 = -0.1990$ | $d_5 = 0.004$ | $n_5 = 1.55232$ | $v_5 = 63.5$ |
| $R_9 = \infty$ | | | | wherein $R_1$ to $R_9$ denote the radii of the refracting surfaces of the lens members of the objective, $d_1$ to $d_5$ denote the axial thickness of the lens members, $l_1$ to $l_3$ denote the axial lengths of the air spaces separating lens members in terms of the focal length $f$ of the total system, $n_1$ to $n_5$ denote the indices of refraction of the lens members, and $v_1$ to $v_5$ denote the Abbe numbers "$v$" or dispersion ratios of the lens members.

References Cited in the file of this patent

UNITED STATES PATENTS

| | | |
|---|---|---|
| 2,440,088 | Grey | Apr. 20, 1948 |
| 2,458,836 | Cox | Jan. 11, 1949 |
| 2,660,093 | Bertele | Nov. 24, 1953 |
| 2,660,095 | Cook | Nov. 24, 1953 |
| 2,694,959 | Baker | Nov. 23, 1954 |

FOREIGN PATENTS

| | | |
|---|---|---|
| 487,271 | Germany | Dec. 11, 1929 |